(No Model.)
A. LA JENNESSE.
CLOTHES PROP.
No. 323,044. Patented July 28, 1885.
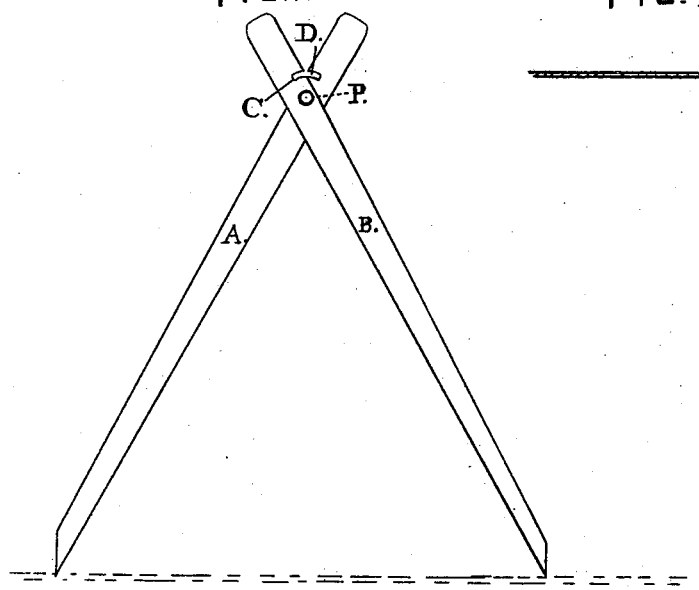
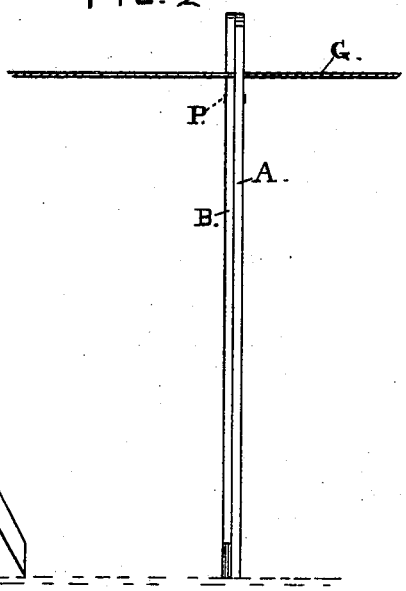
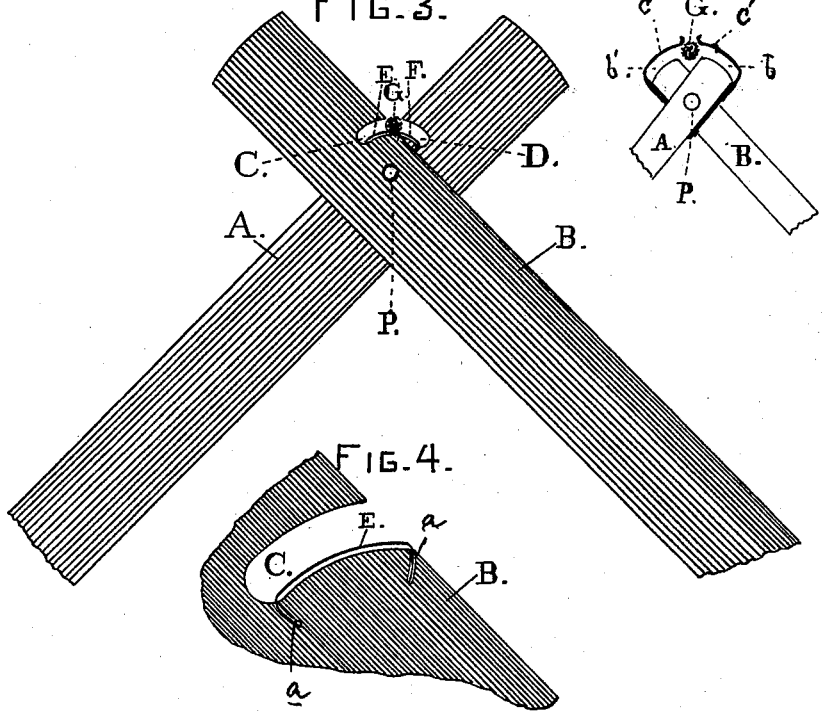
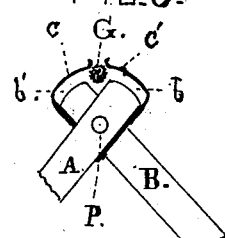
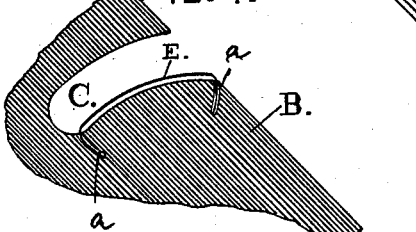
ATTEST,
Albert E. Redstone
L. E. Redstone
INVENTOR,
Adolph La Jennesse
By John H. Redstone
Atty in Fact

UNITED STATES PATENT OFFICE.

ADOLPH LA JENNESSE, OF OAKLAND, CALIFORNIA.

CLOTHES-PROP.

SPECIFICATION forming part of Letters Patent No. 323,044, dated July 28, 1885.

Application filed June 6, 1884. (No model.)

*To all whom it may concern:*

Be it known that I, ADOLPH LA JENNESSE, a citizen of the United States, residing at Oakland, in the county of Alameda and State of California, have invented a new and useful Clothes-Prop, of which the following is a specification.

My invention relates to improvements in clothes-props; and it consists in a certain device for clamping the clothes-line and holding the same to any desired elevation. It will be readily understood by reference to the accompanying drawings, and the letters marked thereon.

Figure 1 is a side elevation, and Fig. 2 an edge view, of the same in the position of holding a clothes-line up. Fig. 3 is a broken view on an enlarged scale, for the purpose of showing the position of the springs in the clamping-notches C and D when about to close upon the line G. Fig. 4 is a view of the clamping-notch C and spring E, broken out of the bar B; and Fig. 5 shows a modification.

The following is the construction and operation of the same: A and B represent the bars or sticks forming the shears of the prop or clothes-line support; C and D, the clamping-notches; E and F, the springs. The said springs E and F have their ends turned downwardly, and engage notches $a$, communicating with the notches C D, the springs being slightly raised from the lower faces of the notches, so that when the line is inserted therein it will be securely clamped by said springs. G is the clothes-line.

In inserting the clothes-line in the notches C and D, the shears are let down to the position shown in Fig. 3, which opens a space between the notches sufficiently wide to allow the line to drop between. Then, as the shears are raised, the clamp-notches C and D close upon the clothes-line G, the springs E and F bearing tightly up against the line, thus clamping the same at all points, as it is pressed into the notches in closing the shear.

I have shown, Fig. 5 in order to illustrate one mode of construction, in which I form the outer line of the curves $b$ $b'$ by the springs $c$ $c'$, which serve the same purpose of clamping the line as the springs shown in Fig. 3. I find the mode of construction shown in Fig. 5 more desirable than any other, except that I construct that shown in Figs. 1, 2, 3, and 4 more cheaply at present. Consequently I have been constructing them in that style. The springs have to be made much heavier and better finished where they are placed, as shown in Fig. 5.

It will be seen that the springs E and F may be made with sufficient elasticity to allow the use of the same upon the different-sized lines.

It will be seen that the notches C and D are curved concentrically with the pivot P, so that the clothes-line G fits about as tightly at one part as another, but always sufficiently tight to prevent any slipping upon the line.

Having thus described my invention, what I claim, and desire to secure by Letters Patent, is—

1. The combination of the bars, pivoted together near their upper ends, and springs carried by said bar for clamping the line by bearing directly upon the same, as set forth.

2. In a clothes-line prop, the combination of the bars A B, pivoted together near their upper ends and provided with notches C D and springs E F, located in said notches, as set forth.

ADOLPH LA JENNESSE.

Witnesses:
E. H. THARP,
S. R. THORPE.